Figure 1:
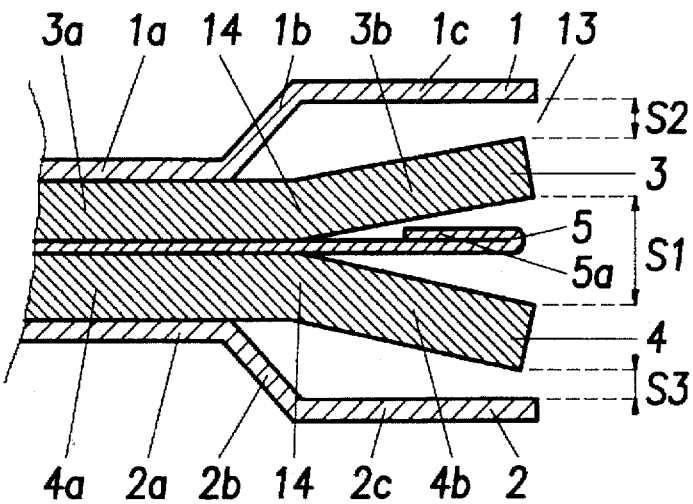

United States Patent [19]
Höhe et al.

[11] Patent Number: 5,669,615
[45] Date of Patent: Sep. 23, 1997

[54] METAL GASKET WITH BEADED COVER PLATES AND SANDWICH SHEET HAVING NONPARALLELED APPROACHING EDGE

[75] Inventors: Kurt Höhe, Langenau; Hans Katzmaier, Beimerstetten; Josef Ludwig, Niederstotzingen, all of Germany

[73] Assignee: Reinz-Dichtungs-Gesellschaft mbH, Neu-Ulm, Germany

[21] Appl. No.: 754,488

[22] Filed: Dec. 4, 1996

Related U.S. Application Data

[63] Continuation of Ser. No. 455,088, May 31, 1995, abandoned.

[30] Foreign Application Priority Data

Sep. 14, 1994 [DE] Germany ............... 694 14 941.0

[51] Int. Cl.⁶ ............................................. F16J 15/08
[52] U.S. Cl. ............................................. 277/235 B
[58] Field of Search .......................... 277/180, 205, 277/206 A, 235 B, 236

[56] References Cited

U.S. PATENT DOCUMENTS

| | | | |
|---|---|---|---|
| 4,721,315 | 1/1988 | Ueta | 277/235 B |
| 4,948,153 | 8/1990 | Takahashi et al. | 277/235 B |
| 5,149,110 | 9/1992 | Inamura | 277/235 B |
| 5,205,566 | 4/1993 | Ueta et al. | 277/235 B |
| 5,213,345 | 5/1993 | Udagawa | 277/235 B |
| 5,230,521 | 7/1993 | Ueta | 277/235 B |
| 5,286,039 | 2/1994 | Kawaguchi et al. | 277/235 B |
| 5,294,135 | 3/1994 | Kubouchi et al. | 277/235 B |
| 5,348,315 | 9/1994 | Kawaguchi et al. | 277/235 B |
| 5,378,001 | 1/1995 | Miyaoh | 277/235 B |
| 5,395,128 | 3/1995 | Udagawa | 277/235 B |

FOREIGN PATENT DOCUMENTS

| | | | |
|---|---|---|---|
| 4733061 | 8/1991 | European Pat. Off. | |
| 544951 | 6/1993 | European Pat. Off. | 277/235 B |
| 4219709 A1 | 6/1992 | Germany | |
| 50433 | 2/1994 | Japan | 277/235 B |
| 50434 | 2/1994 | Japan | 277/235 B |
| 147326 | 5/1994 | Japan | 277/235 B |

*Primary Examiner*—Scott Cummings
*Attorney, Agent, or Firm*—Tilton, Fallon, Lungmus & Chestnut

[57] ABSTRACT

The invention relates to a metal gasket, in particular a cylinder head gasket, having two beaded metallic cover sheets and having at least one sandwich sheet, which surrounds an opening. The sandwich sheet features a folded edge, that lies in the region of one of the beads of one of the cover sheets. Further, the folded edge is formed in the direction of one of the beads.

21 Claims, 5 Drawing Sheets

METAL GASKET WITH BEADED COVER PLATES AND SANDWICH SHEET HAVING NONPARALLELED APPROACHING EDGE

This application is a continuation of application Ser. No. 08/455,088, filed May 31, 1995, now abandoned.

The invention relates to a metal gasket, in particular a cylinder head gasket, having two beaded metallic cover sheets and having at least one sandwich sheet.

Such a gasket is revealed in EP 0 473 306 A1. Described in this document are beaded sandwich sheets, which match in material thickness and form to the beaded metallic cover sheets. The beaded sandwich sheets are arranged to lie against the cover sheets or arranged with mirror-image aligned beads, whereby in the second case the non-bonded web of the two sandwich sheets lie against each other. This arrangement cannot provide any additional graduated elasticity.

A gasket of the same generic type is also revealed in DE 42 19 709 A1. This document discloses a sandwich sheet having a thickened end, which maintains the form of the beaded cover sheet and ensures a good seal under thermal and mechanical loads/stresses.

Since the gap to be sealed between the cylinder head and the cylinder block of an internal combustion engine oscillates, due to internal pressure and temperature fluctuations and, as a result, a sealing element/gasket is subjected to constant changes in pressure, the gasket should possess the best possible and durable spring-like properties (properties of suppleness). In the present state of the art, elasticity is provided by the formation of beads in the cover sheets and by the engine components. Satisfactory sealing cannot be attained by this, especially on the more powerful engines.

It is the object of the invention to create a cylinder head gasket which does not rely upon engine components for the required elasticity, but provides this itself.

This problem is resolved in accordance with the claimed features of claim 1. Advantageous embodiments are described in the associated sub-claims.

In accordance with the prime concept of the invention, a folded edge sandwich sheet is arranged between the cover sheets, which due to its leading edge possesses elasticity, which produces a constant pressure against the cover sheet. The required elasticity is generated by the gasket itself. As a consequence, an acceptable combustion chamber seal is achieved.

The term "edge/edging" with respect to a sandwich sheet or a folded edge sandwich sheet means a sheet having a crink or crease. The sandwich sheet is therefore folded so that a non-bonded webbed edge projects from the plane of the sheet. The webbed edge can be straight, in which an angled section to the plane of the sheet is distinctively provided. As an alternative, the webbed edge can also feature an arched cross section, so that a continuous transition is accomplished by the plane of the sheet, providing a large angle to the plane of the sheet in relation to the end of the web.

Another advantage of the invention is that the folded edging prevents an outer elastomer lamination/coating of the bead sheets from spreading/flowing away towards the interior of the combustion chamber, due to an increased linear compression (line contact) directly at the combustion chamber. As a result, micro-sealing is improved at the combustion chamber.

In a preferred embodiment of the invention, the folded edge sandwich sheet is simultaneously formed as a thick spacer sheet. Due to this formation as a thick formed spacer sheet, no additional sandwich sheet is needed, which would otherwise be needed for forming this thickness.

In an advantageous embodiment, the sandwich sheet features a folded edging of greater thickness than the cover sheets. As a result, durable flexible and spring-like properties are assured.

Particularly advantageous is the formation of two folded edge sandwich sheets, which provide elasticity in each case in the direction towards a cover sheet. These identical sheets form the thickness spacer. As a result, a spring-like elasticity can be provided in the direction towards the cylinder head and a second spring-like elasticity in the direction towards the engine block.

In another embodiment, the sandwich sheets are arranged symmetrically to a center plane of the gasket. A uniform/equal distribution of forces and elasticity is thus effected in both directions. Alternatively, the edges of the sandwich sheets can also be offset. In so doing, one achieves an individual adaptation to match the conditions of forces acting on the cylinder head face and to match the conditions of forces acting on the engine block face.

In another advantageous embodiment, the folded edging features differing slopes of angle along a predetermined distance in circumferential direction. Likewise, the folded edging can feature a dissimilar/differing length of web along a predetermined distance in circumferential direction. As a result, formation of the gasket to suit localized conditions is possible in circumferential direction. Differing elasticity can be provided in various directions at each point of the circumference. The gasket can therefore be formed topographically along the passage/line to be sealed.

In another embodiment, the sandwich sheet with its folded edging features an additional bead in the non-bonded webbed edge. Consequently, additional elasticity is provided, which also supports and maintains the form of the outer cover sheets prior to being compressed flat.

In another embodiment, the non-bonded webbed edge is provided with a caulked seam. This provides a thickening at the end of the folded edging of the sandwich sheet. This thickening prevents the beaded cover sheets from compressing flat and thus retains its outer edge elasticity.

In a preferred embodiment, an additional flat sandwich sheet is provided without any folded edging, but has a folded seam, which lies beneath the non-bonded web. This additional flat sandwich sheet also provides a thickening at the end, and thus provides support for the bead of the outer cover sheets. In addition, a defined bearing surface is thus created for the folded edging of the sandwich sheets.

In another embodiment, the crimped-over seam of the additional sandwich sheet terminates beneath the bottom point of the non-bonded web. This leads to an additional increase in compression behind the folded edging and thus increases the security of the seal.

In another advantageous embodiment, the additional sandwich sheet features a fold at a point in front of the crimped-over seam. This means that the sandwich sheet lies in the center plane of the gasket and a uniform seal is provided on both sides.

It is also possible to manufacture the individual sheets out of dissimilar materials, in order to ensure optimum matching of the sheets in their function, due to the properties of the materials.

The invention is further described in the following connection with the examples depicted in the drawing.

FIGS. 1 to 14 each depict schematically, a cross section by way of example through an edge of a cutaway/opening of a metal gasket.

In the following description identical parts are provided, in each case, having the same item references. The details/description of these parts, provided with the aid of a special illustration, are/is, therefore, applicable to all other illustrations involved, even if there is no specific illustrative detail provided relating this.

FIG. 1 depicts a cross section through a cylinder head gasket in the region of an edge 13 of a cutout/opening. On the right hand side of the drawing is shown the cutout/opening, while the left hand side illustrates the transition into the metallic gasket. The installed state is bordered in this drawing at the top by a cylinder head and at the bottom in the drawing by a cylinder block.

The beaded cover sheets 1 and 2 feature a bonded web section 1a and 2a in each case, a beaded transition zone 1b and 2b and a non-bonded webbed edge 1c and 2c. The beads 1b and 2b of the cover sheets 1 and 2 are formed at the same distance to the cutout/opening edge 13. An asymmetrical formation is also possible here. The beaded cover sheets are depicted in the drawing having open beads 1b and 2b. However, the invention can also be used in design forms, the cover sheets of which feature a closed bead.

The sandwich sheets 3 and 4 feature a bonded web section 3a and 4a, a non-bonded webbed edge 3b and 4b and folded edging 14. The folded edging 14 is in the zone of the beads 1b and 2b of the cover sheets 1 and 2. The sandwich sheets 3 and 4 extend in their length right up to the cutout/opening edge 13 and thus provide additional elasticity over the entire length of the cover sheets 1 and 2. In the region of the cutout/opening edge 13, the opening of the folded edge sandwich sheets forms a gap S1. The gaps between the cover sheets 1 and 2 and the sandwich sheets 3 and 4 are denoted by S2 and S3. S1 is greater than the sum of S2 and S3. The non-bonded webbed edge of the sandwich sheets 3b and 4b are shown straight in the drawing. It is also conceivable for the contour to be arched in an outwards pointing direction.

Figure 11:
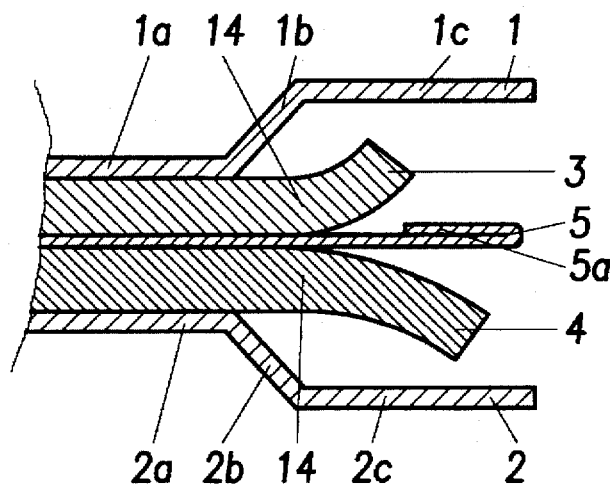
Figure 12:
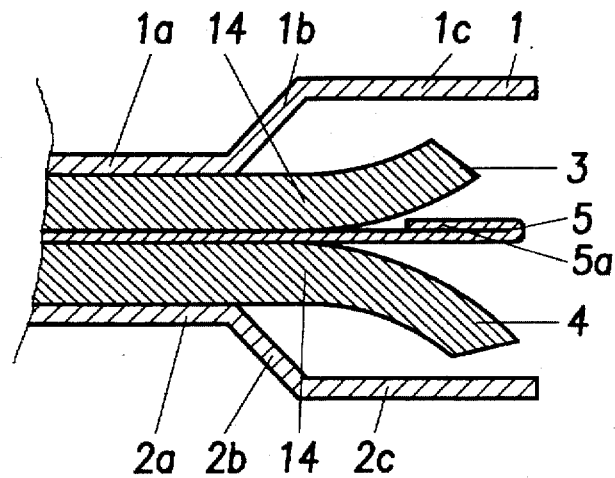
Figure 13:
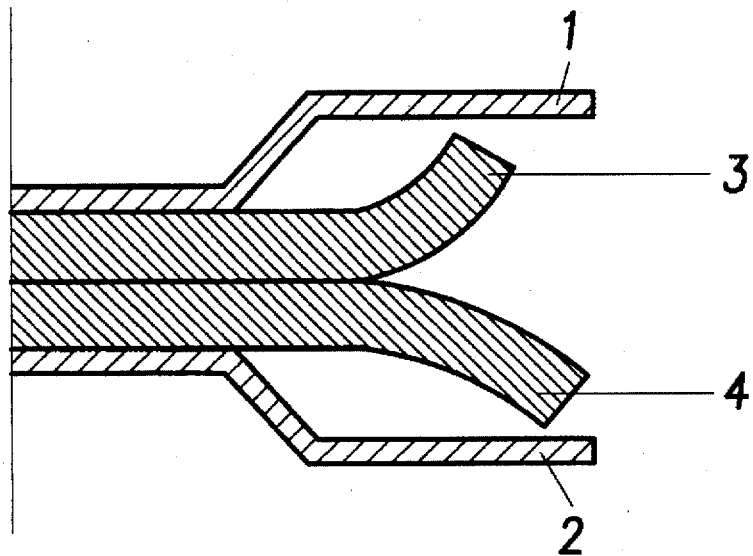
Figure 14:
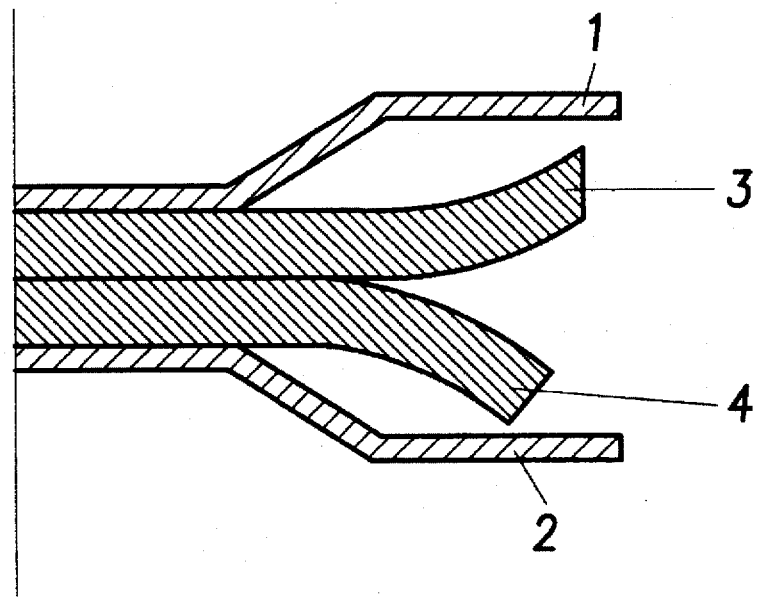

The folded edging 14 of uniform height and width of the spacer sheets 3 and 4, running symmetrically around the combustion chamber, produces a pre-tension around the combustion chamber, which is maintained, even over an extended service period and even during the deformation of the engine components through the operating forces and/or through thermal loading. The folded edging is open in the direction towards the interior of the combustion chamber, so that the pre-tension is not diminished by the operating pressures, but is even increased. However, along the opening, the folded edging can be formed topographically and having variable width too. That means that the folded edging 14 can be formed both with differing angles of slope along a predetermined distance in circumferential direction as shown in FIGS. 11 and 13, as well as being formed with dissimilar lengths of the non-bonded webbed edging along a predetermined distance in circumferential direction as shown in FIGS. 12 and 14. As a result, individual matching to the respective engine components is achieved.

An additional, flat sandwich sheet 5 is also depicted in FIG. 1. The folded edging 14 of the sandwich sheets 3 and 4 is formed such that it does not lie upon the caulked seam 5a of the sandwich sheet 5 lying in the centre plane of the gasket. The caulked seam 5a is therefore arranged at a gap away from the folded edging 14 in the region of the non-bonded webbed edge 3b of the sandwich sheet 3.

Figure 2:
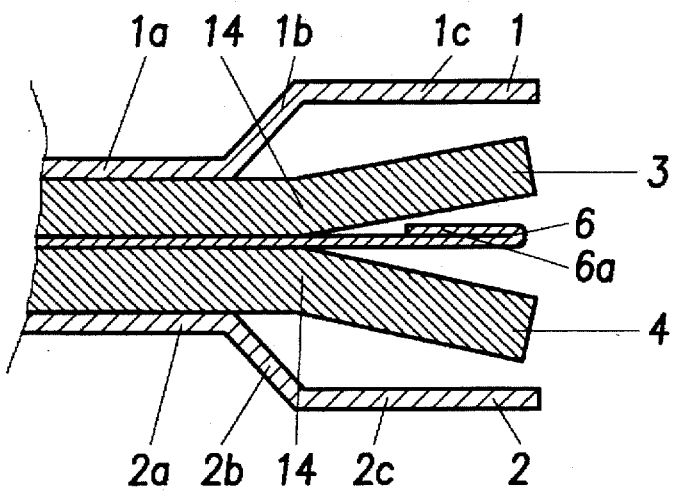

The folded edging 14 of the spacer sheets 3 and 4 in FIG. 2 are formed such that they lie upon the caulked seam 6a or the crimped-over seam of sheet 6. This leads to increased additional pressure behind the folded edging 14, and thus increases the security of the seal. In this example, the crimped-over seam 6a is formed, with regard to the interior of the combustion chamber, to almost the second fold of the beads 1b and 2b of the cover sheets 1 and 2. Cover sheets 1 and 2 feature parallel non-bonded webbed edges 1c and 2c, parallel bonded web sections 1a and 2a and an angled beaded transition zone 1b and 2b. In the region of this beaded transition zone 1b is the folded edging 14 of the sandwich sheets 3 and 4. In respect to the bonded end 1a of the cover sheets 1 and 2, the folded edging 14 is produced just after the start of the crimped-over seam 6a.

Figure 3:
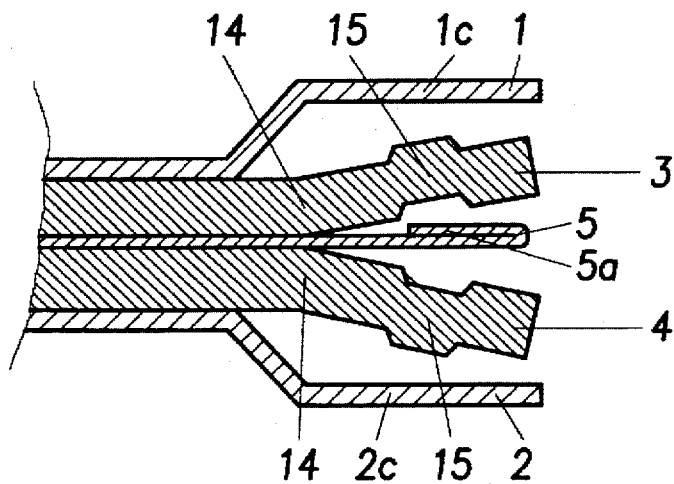

Once again FIG. 3 depicts an additional sandwich sheet 5, which has a crimped-over seam 5a, which, in respect to the bonded end 1a of the cover sheets 1 and 2, starts just after the folded edging 14. The folded edge sandwich sheets feature an additional bridge-like bead 15, which lies in the region of the crimped-over seam 5a of the additional sandwich sheet 5. Bead 15 of the said sandwich sheets 3 and 4 lies in the region of the non-bonded webbed edge 1c and 2c of the outer cover sheets 1 and 2.

Figure 4:
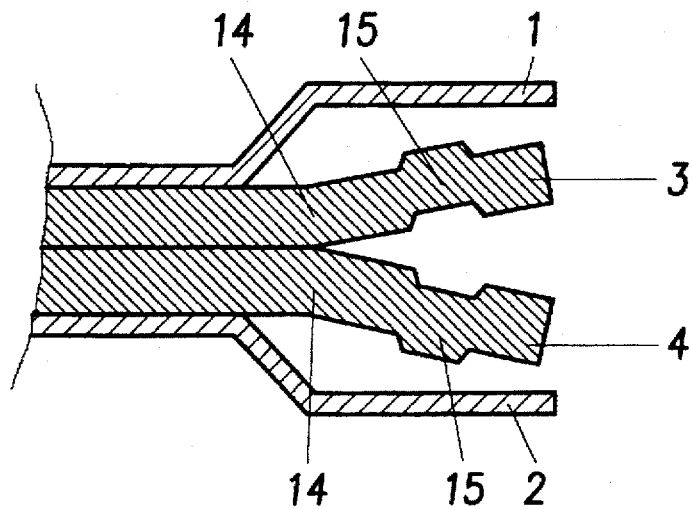
Figure 5:
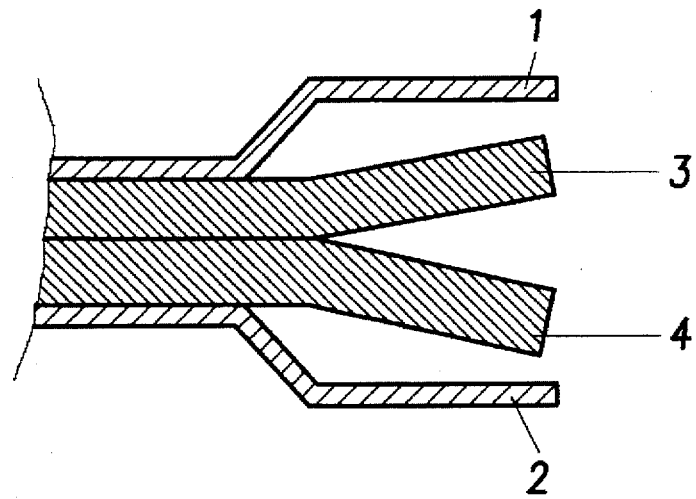

FIGS. 4 and 5 correspond to FIGS. 3 and 2, but these design forms are depicted without the additional sandwich sheets 5 and 6.

Figure 6:
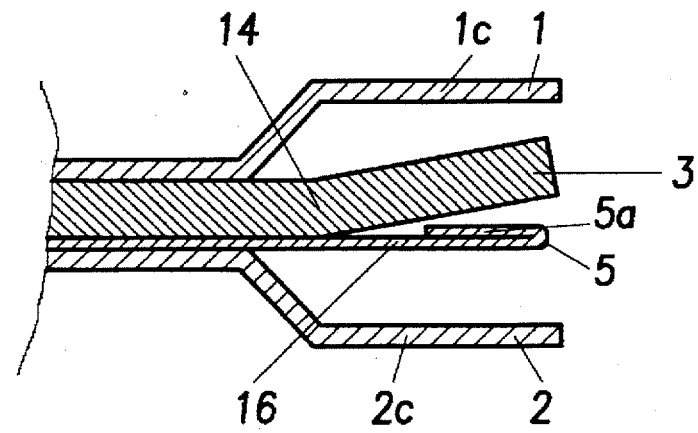

In FIG. 6 the folded edging 14 is only made on one sandwich sheet 3, which at the same time is the thickness forming spacer sheet. The folded edging 14 can either face the cylinder head or the engine block as required. In addition, another sandwich sheet 5 is provided, which is creased. The crease 16 runs towards the opposite side, like the edging 14 of the sandwich sheet 3. The folded edging 14 of the sandwich sheet 3 is produced in the region of the non-bonded web 1c of the cover sheets 1 and 2. The crease 16 is made somewhat closer to the interior of the combustion chamber, which faces away from the folded edging 14. The crimped-over seam 5a of the additional sandwich sheet 5 extends back up to the crease 16.

Figure 7:
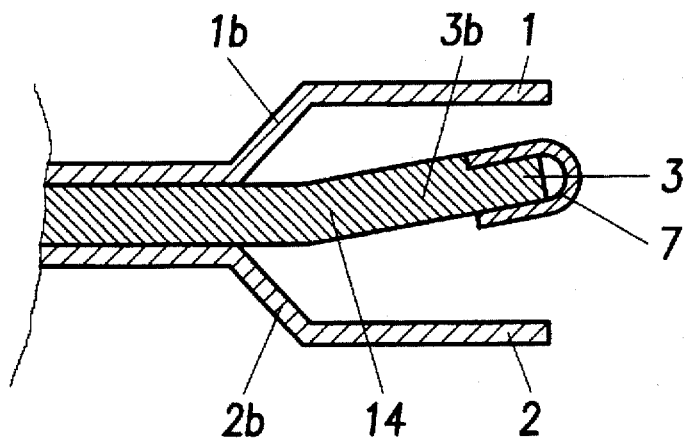

The folded edging 14 in FIG. 7 is made on a separate spacer sheet 3. The folded edging is made in the angled zone of the bead 1b of the cover sheets 1 and 2. The folded edge sandwich sheet 3 has an additional caulked seam 7. The folded edging 14 can either face the cylinder head or the engine block as required.

Figure 8:
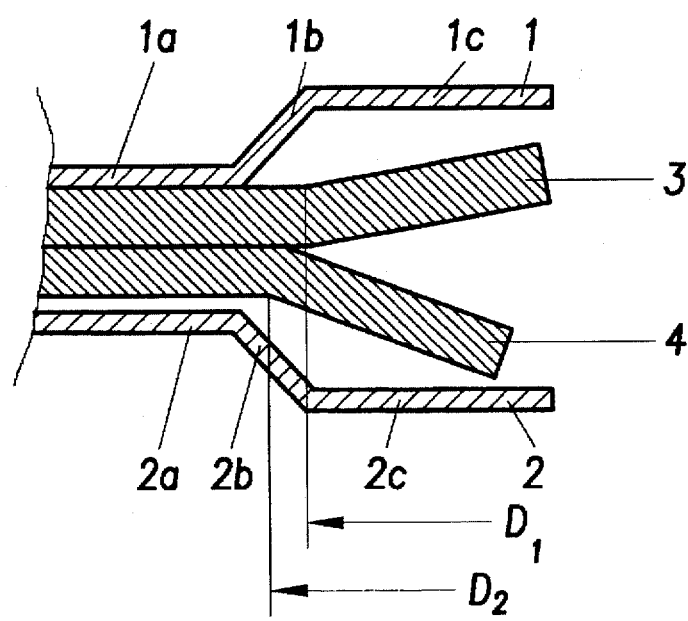

Two folded edge spacer sheets 8 and 9 are provided in FIG. 8. The folded edging 14 of the spacer sheets 8 and 9 are not congruent, but have dissimilar diameters D1 and D2. This causes a counter-moment to be produced, which increases elasticity and compression. The folded edge sandwich sheets 8 and 9 can be produced having dissimilar lengths and widths. The folded edging 14 is made, in the case of sandwich sheet 4, in the transitional zone of bead 2b of the cover sheet 2, and in the case of sandwich sheet 3, the folded edging 14 is made in the region of the non-bonded web 1c of the cover sheet 1. This involves a folded edge 14 being made on dissimilar diameters. The direction in which the force of the counter-moment acts can be influenced as required, by providing the larger diameter on the cover sheet 1 or on the cover sheet 2, so as to apply force in the direction of the cylinder head or the engine block. Even here the provision of an additional sandwich sheet 5 or 6 is possible.

Figure 9:
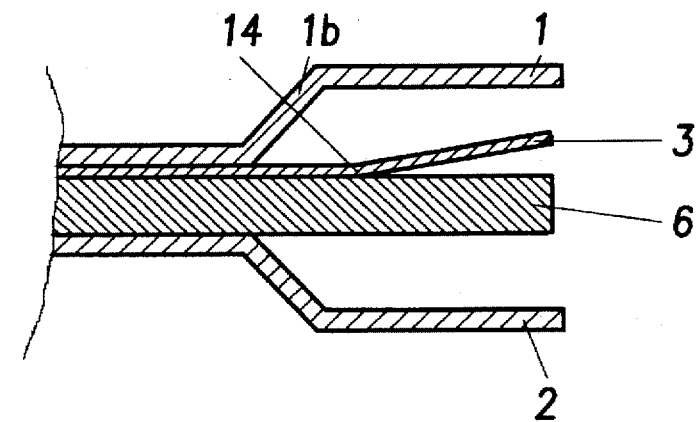

An additional sandwich sheet 6 is formed in FIG. 9 as a thickness forming spacer sheet. The folded edging 14 is made on a sandwich sheet 3 in the transition zone of bead 1b of the cover sheet 1. However, it can be formed, if required, on the other side—on cover sheet 2. In this arrangement, the additional sandwich sheet 6 is thicker than the folded edge sandwich sheet 3. Likewise, a further embodiment employing caulked seams or crimped-over sandwich sheets is possible.

Figure 10:
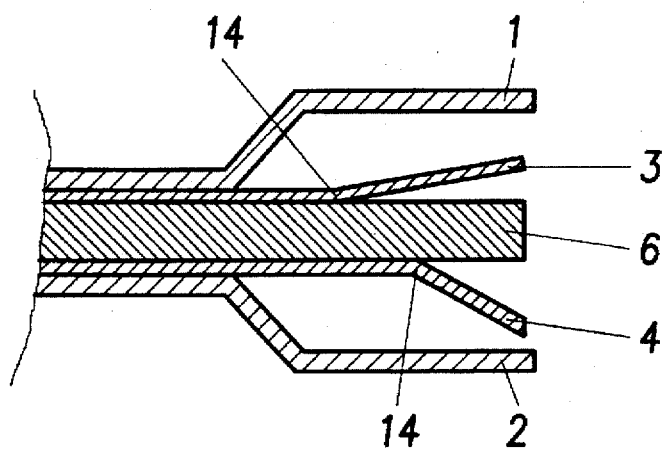

An additional sandwich sheet 6 is formed in FIG. 10 as a spacer sheet. The sandwich sheets 3 and 4 having a folded edging 14 are thinner than the sandwich sheet 6. The folded edging 14 of the sandwich sheets 3 and 4 is made on dissimilar diameters, as has already been depicted in FIG. 8.

We claim:

1. A metallic gasket having two beaded cover sheets and having at least one sandwich sheet which surrounds an opening, wherein said sandwich sheet (3) includes a folded edge (14), said folded edge (14) lying in the region of one of the beads (1b, 2b) of one of said cover sheets (1, 2) and being formed in the direction toward and approaching one of said beads (1b, 2b) so that a non-bonded webbed edge is formed, said non-bonded webbed edge having an arched cross section with a continuous transition curving in the direction toward one of said beads (1b, 2b) in the same direction as said folded edge, and said non-bonded webbed edge of the sandwich sheet is not parallel to either of said beads.

2. A metallic gasket according to claim 1, wherein said sandwich sheet (3) with said folded edge (14) is formed as a thickness forming spacer sheet.

3. A metallic gasket according to claims 1 or 2, wherein said sandwich sheet (3) with said folded edge (14) has a greater thickness than said cover sheets (1, 2).

4. A metallic gasket according to claims 1 or 2, wherein said gasket includes two sandwich sheets (3, 4) each having a folded edge (14), with one of said folded edges being formed in the direction of one of said beads and the other of said folded edges being formed in the direction of the other of said beads.

5. A metallic gasket according to claim 4, wherein said two sandwich sheets (3, 4) are arranged symmetrically to a center plane of the gasket.

6. A metallic gasket according to claim 4, wherein said folded edges (14) of said sandwich sheets (8,9) are positioned offset to each other.

7. A metallic gasket according to claims 1 or 2, wherein said gasket includes two sandwich sheets (3, 4) each having a folded edge (14), each of said folded edges featuring differing angles of slope along a predetermined path in a circumferential direction.

8. A metallic gasket according to claims 1 or 2, wherein said gasket includes two sandwich sheets (3, 4) each having a folded edge (14), each of said folded edges including a plurality of non-bonded web portions of dissimilar lengths (3b, 4b) along a predetermined path in a circumferential direction.

9. A metallic gasket according to claims 1 or 2, wherein said sandwich sheet (3) having a folded edge (14) includes an additional bead (15) on said non-bonded webbed edge (3b).

10. A metallic gasket according to claims 1 or 2, wherein said non-bonded webbed edge (3b) of the spacer sheet (3) having a folded edge (14) is provided with a caulked seam (7).

11. A metallic gasket according to claims 1 or 2, wherein an additional flat sandwich sheet (5) is provided, without the provision of a folded edge, which includes a crimped-over seam (5a) which lies beneath said non-bonded web (3b).

12. A metallic gasket according to claims 1 or 2, wherein an additional flat sandwich sheet (5) is provided, without the provision of a folded edge, which includes a crimped-over seam (5a) which lies beneath said non-bonded web (3b), said crimped-over seam of the additional sandwich sheet (5) terminates in the region of said bonded web (3a) of said sandwich sheet (3) having a folded edge (14).

13. A metallic gasket according to claim 11, wherein said additional sandwich sheet (5) includes a crease (16) located between said crimped-over seam (15a) and said bonded web.

14. A metallic gasket having two beaded cover sheets and having at least one sandwich sheet which surrounds an opening, wherein said sandwich sheet (3) includes a folded edge (14), said folded edge (14) lying in the region of one of the beads (1b, 2b) of one of said cover sheets (1, 2) and being formed in the direction toward and approaching one of said beads (1b, 2b) so that a non-bonded webbed edge is formed, said non-bonded webbed edge being straight and is not parallel to either of said beads.

15. A metallic gasket according to claim 14, wherein said sandwich sheet (3) with said folding edge (14) is formed as a thickness forming spacer sheet.

16. A metallic gasket according to claims 14 or 15, wherein said sandwich sheet (3) with said folded edge (14) has a greater thickness than said cover sheets (1, 2).

17. A metallic gasket according to claims 14 or 15, wherein said gasket includes two sandwich sheets (3, 4) each having a folded edge (14).

18. A metallic gasket according to claim 17, wherein said folded edges (14) of said sandwich sheets (8, 9) are positioned offset to each other.

19. A metallic gasket according to claims 14 or 15, wherein an additional flat sandwich sheet (5) is provided, without the provision of a folded edge, which includes a crimped-over seam (5a) which lies beneath said non-bonded web (3b).

20. A metallic gasket according to claims 14 or 15, wherein an additional flat sandwich sheet (5) is provided, without the provision of a folded edge, which includes a crimped-over seam (5a) which lies beneath said non-bonded web (3b), said crimped-over seam of the additional sandwich sheet (6) terminates in the region of said bonded web (3a) of said sandwich sheet (3) having a folded edge (14).

21. A metallic gasket according to claim 18, wherein said additional sandwich sheet (5) includes a crease (16) located between said crimped-over seam (15a) and said bonded web.

* * * * *